Oct. 2, 1962   L. W. SACHS   3,056,852
STRAIN RELIEF GROMMET
Filed March 31, 1961

LESLIE W. SACHS
INVENTOR.

BY William P. Green
ATTORNEY

United States Patent Office 3,056,852
Patented Oct. 2, 1962

1

3,056,852
STRAIN RELIEF GROMMET
Leslie W. Sachs, 1234 Roanoke Road, San Marino, Calif.
Filed Mar. 31, 1961, Ser. No. 99,779
14 Claims. (Cl. 174—153)

This invention relates to an improved type of strain relief grommet assembly to be disposed about an electrical cord at a point where the cord passes through an opening in a wall of an electrical appliance or the like.

In electrical appliances, it is usually highly desirable if not essential that some means be provided for taking the strain exerted by the cord if the cord is accidentally pulled in a direction tending to disconnect it from the appliance. One expedient for this purpose, is to merely tie a knot in the cord at the inside of the appliance, with the knot being too large to be pulled outwardly through an opening in a wall of the housing of the device. This arrangement, however, has the disadvantage that it may cause the insulation on the wire to wear very rapidly at the location of the knot, and thereby create a dangerous short circuiting condition. To overcome this and other disadvantages of the simple knot arrangement, various types of grommets have been designed in the past, for taking the strain forces exerted by a cord in a manner decreasing the tendency for damage to the cord or any parts to which it is connected. However, none of these prior grommets with which I am familiar has proven completely satisfactory in use. For example, some such grommets have been so designed as to be incapable of effectively retaining a cord against unwanted movement. Other devices have been either too difficult to manufacture, or too difficult to mount on the appliance and about a cord at the time of initial assembly.

The general object of the present invention is to provide an improved strain relief grommet assembly which is adapted to overcome the above discussed disadvantages of the various prior expedients designed for this purpose. As will appear, a grommet assembly constructed in accordance with the invention is adapted for very easy application to a cord, and easy connection to an appliance, and after such application acts very positively to restrain the associated cord against movement in any direction. The assembly grips the cord very effectively, but over a sufficiently extended area to prevent damage to the insulation of the cord by virtue of the gripping action.

To attain these results, the assembly is formed of two sections, one of which is received within the other and is adapted to be cammed inwardly into tight gripping engagement with the cord as the two sections are assembled together. In the completely assembled condition, specially formed shoulders on the two sections act to retain them against relative separation, so that the cord and the two sections of the grommet assembly are locked in assembled condition. Preferably, each of the sections includes a plurality of complementary segments, which may be movably secured together by small flexible straps joining corresponding sides of the segments.

The above and other features and objects of the present invention will be better understood from the following detailed description of the typical embodiment illustrated in the accompanying drawing in which:

FIG. 1 is a view representing the two sections of the grommet assembly before they are connected together;

2

Figure 1:
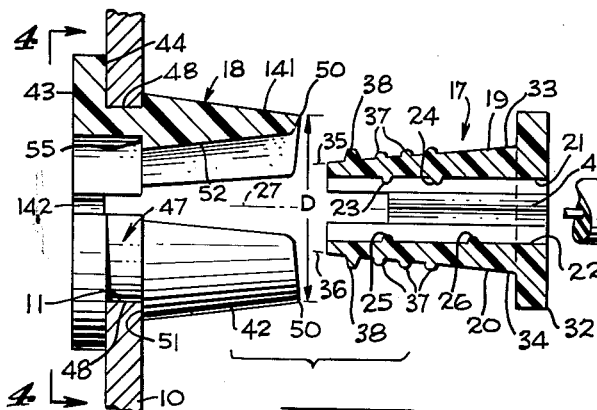

Referring first to FIG. 1, there is represented at 10 a wall through which an electric cord is to pass. This wall 10 may be formed of sheet metal or the like, and contains a circular opening 11 for passing the cord. The right hand side of wall 10, as viewed in FIG. 1, may be the interior of an electrical appliance, while the left hand side of the wall is at the outside of the appliance. The cord is represented at 12 in FIGS. 2 and 3, and may be a completely conventional essentially flat cord of the type used almost universally in modern appliances. This cord 12 contains two parallel conductors 13 and 14, with rubber or plastic insulation 15 extending about each of the wires and merging together at 16 to secure the two insulated wires in side-by-side relation. It will of course be understood that, while the present device is in certain respects especially desirable for use with the particular type of cord illustrated in FIGS. 2 and 3, the grommet assembly can also be employed with cords of other design and other cross sectional configurations.

The two sections of the grommet assembly itself are designated 17 and 18 in the drawing. Describing first the inner section 17, which engages and grips cord 12, this section 17 is desirably formed of two closely similar halves or segments 19 and 20, engaging opposite sides of the cord. In the positions typically illustrated in the drawing, segment 19 engages the upper side of the cord, while segment 20 engages the under side of the cord. More particularly, top segment 19 has at its under side a planar cord engaging surface 21 extending parallel to the corresponding planar upper cord engaging surface 22 formed on bottom segment 20. The straight planar configuration of surfaces 21 and 22 is continuous through the entire axial length of section 17, except at the locations of transverse downwardly projecting ribs 23 and 24 formed on surface 21, and transverse upwardly projecting ribs 25 and 26 formed on surface 22. These projections or ribs 23 through 26 project a short distance into the resilient insulation of cord 12, to positively lock the cord against axial movement when it is gripped between segments 19 and 20. At the same time, however, the ribs 23 to 26 are rounded as shown, to prevent these ribs from cutting or otherwise damaging the insulation. As seen in FIG. 1, the two ribs 23 and 25 may be directly opposite one another transversely of the axis 27 of the grommet assembly and cord, with the other two projections 24 and 26 being offset from one another longitudinally of axis 27, to increase the effectiveness of the cord gripping action.

Extending along one side of surfaces 21 and 22, segments 19 and 20 have planar surfaces 28 and 29 for retaining the cord against lateral movement, while at the opposite side of surfaces 21 and 22, segments 19 and 20 have similar planar surfaces 30 and 31 for retaining the cord against lateral movement in the opposite direction.

All of these surfaces 28 through 31 should extend parallel to the main axis 27 of the device. Thus, surfaces 20, 21, 28, 29, 30, and 31 form together an elongated passage of essentially rectangular cross section through which cord 12 may pass. In the ultimate assembled condition of FIG. 3, the cross section of this essentially rectangular passage formed within section 17 is small enough to cause constriction of the insulation 15 of cord 12, so that section 17 tightly grips and frictionally holds the cord against movement in any direction. In most instances, it is desirable to have the two surfaces 28 and 30 of segment 19 flare slightly apart as they advance downwardly (in FIG. 3), with the two surfaces 29 and 31 in segment 20 flaring slightly apart as they advance upwardly in that figure.

Figure 2:
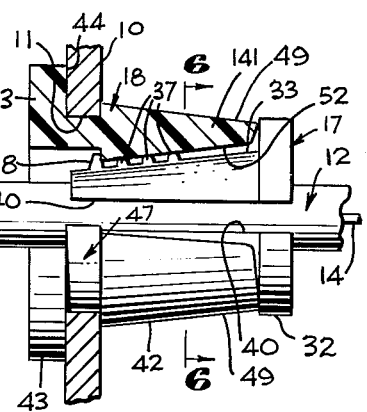
FIG. 2 is a view showing the two sections and associated electrical cord after complete assembly.
Figure 3:
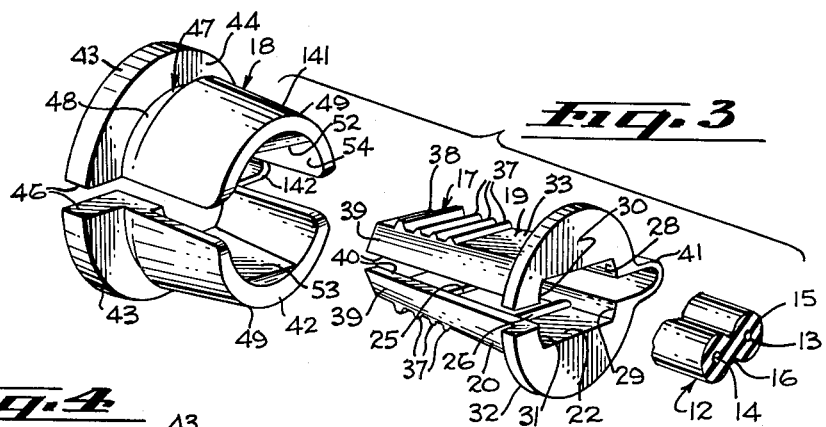
FIG. 3 is an exploded perspective view representing the two sections and the cord.
Figure 6:
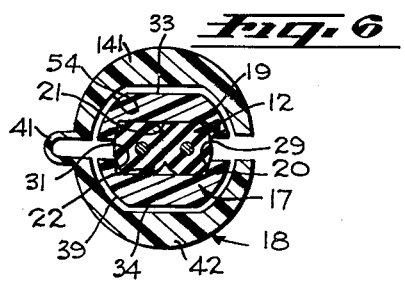
FIG. 6 is a section taken on line 6—6 of FIG. 2.

Externally, the two segments 19 and 20 of section 17 have at one axial end semi-circular radially outwardly projecting complementary flanges 32, forming together essentially a circular flange for engagement with section 18 in the FIG. 2 assembled condition of the grommet structure. To the left of flanges 32, segments 19 and 20 have upper and lower surfaces 33 and 34, which may be considered as lying in two converging planes 35 and 36, except where surfaces 33 and 34 are interrupted by several (typically four) transverse radially outwardly projecting shoulders, three of which are designated 37 in the drawing, and the final one of which is designated 38. These shoulders 37 and 38 may extend entirely across the width of surfaces 33 and 34, and may be of uniform cross-section that entire width. At the opposite sides of surfaces 33 and 34 (see FIG. 6), the segments 19 and 20 may have external surfaces 39, with these two surfaces 39 of segment 19 flaring slightly as they advance downwardly, and surfaces 39 of lower segment 20 flaring slightly as they advance upwardly. Surfaces 39 (and the internal surfaces 28 through 30) may terminate at parallel edge surfaces 40 of the two segments 19 and 20, which surfaces may be normally spaced apart in parallel relation, as seen in FIGS. 2 and 3, when the device is assembled. Surfaces 40 desirably extend essentially parallel to main axis 27 of the device.

The two sections 17 and 18 of the grommet assembly may be formed of a resinous plastic material, preferably polypropylene. The two halves 19 and 20 of section 17 are desirably formed integrally, being secured together at one side by a thin strip 41 of the resinous plastic material. This strip 41 may extend along the major portion of the length of section 17, as seen in FIG. 1, and is thin enough to allow the two halves to be moved relatively toward and away from one another, to thereby tightly grip the cord. On the other hand, the cross section of the resinous plastic material at points other than strap 41 is such as to render other portions of segments 19 and 20 substantially rigid, to thus form in effect two substantially rigid halves joined together by a flexible hinge strap, hinging the two sections together for relative transverse swinging movement about the axis formed by the strap 41. With reference again to the projections 37 and 38, it is noted that the three projections 37 on each of the segments may be of a common height above surface 33 or 34, while the final projection 38 on each of the segments projects a greater distance from surface 33 or 34.

Section 18, like section 17, is formed of two complementary halves 141 and 42, desirably molded of the same plastic material utilized in section 17, and integrally connected together by a thin flexible strap 142 of the plastic material. The two halves themselves are thicker in cross section than strap 142, and by virtue of that greater thickness are essentially rigid.

Figure 4:
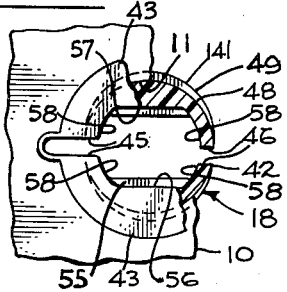
FIG. 4 is a view taken on line 4—4 of FIG. 1, with the outer section of the grommet and the housing wall broken away to illustrate the cross sectional configuration of the outer section.

At their axially outer ends, the two halves 141 and 42 of section 18 have semi-circular complementary flanges 43, whose inner planar surfaces 44 abut against the outer surface of plate 10. In the assembled condition of the grommet structure, the two halves 43 are spaced a short distance apart at two diametrically opposite locations 45 and 46. When in this spaced condition, the flanges 43 are so related as to form in effect portions of a common circle. Axially inwardly of flanges 43, the outer elements 141 and 42 contain essentially semi-circular grooves 47, whose inner walls or surfaces 48 define a common cylinder when the halves are in assembled condition. Axially inwardly of these grooves, the two halves 141 and 42 have tapering outer surfaces 49 of essentially semi-circular cross section, the extremities of which surfaces are spaced apart a maximum distance D (FIG. 1) which is desirably slightly smaller than the diameter of opening 11 in plate 10, so that these extremities 50 may be easily inserted into opening 11. Grooves 47 are defined by the previously mentioned surfaces 44 and 47, and also by transverse shoulders or groove side walls 51 extending between surfaces 48 and 49. As grooves 47 advance circularly from their centers toward the locations of gaps 45 and 46, the depth of the grooves beneath the adjacent portions of surfaces 49 progressively decreases, and ultimately reduces to 0 at the points 45 and 46 (see FIG. 4). Stated differently, the surfaces 48 and 49 progressively merge toward one another, and ultimately into substantially exact alignment, as they approach locations 45 and 46. This enables halves 141 and 42 of section 18 to be inserted into their FIG. 1 position of reception within opening 11 in plate 10 by merely pressing segments 141 and 42 vertically together, and into engagement at 45 and 46. After such insertion, the resilience of the flexible strap portion 142 of section 18 is such as to tend to spread the two halves 141 and 42 relatively apart, so that the inner circular edge of plate 10 about opening 11 is received within both of the grooves 47.

Internally, the halves 141 and 42 of section 18 contain two planar converging surfaces 52 and 53, which in the assembled condition of the grommet extend parallel to the planes 35 and 36 of section 17, and engage the peaks of transverse projections 37. At the opposite sides of surfaces 52 and 53, segments 141 and 42 have inner surfaces 54 received in close proximity to surfaces 39 of section 17. At the axially outer ends of surfaces 52, halves 141 and 42 of section 18 form two shoulders 55 lying in a common plane disposed transversely of axis 27 of the device. These shoulders 55 are engageable with the enlarged shoulders or beads 38 on section 17 to retain the two sections 17 and 18 against relative separation. Axially outwardly beyond the shoulders 55, the opening within the two complementary halves 141 and 42 may be defined by two parallel planar surfaces 56 and 57, and adjacent surfaces 58 of arcuate cross section.

Figure 5:
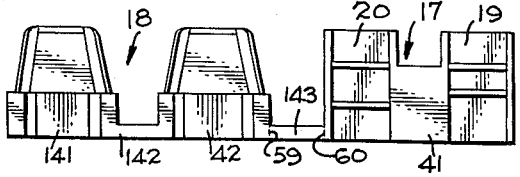
FIG. 5 is a view representing the two sections as they may appear when initially molded as one unit.

Preferably, the sections 17 and 18 are formed by injection molding of the desired polypropylene or other suitable resinous plastic material. In the optimum manufacturing process, the two sections may be molded together as a single strip of the type illustrated in FIG. 5. Here, the two halves 19 and 20 of section 17 are shown in open condition, that is, with the interconnecting flexible integral strap 41 extending flat. Also, the two halves 141 and 42 of section 18 are in an opened condition, with their interconnecting strap 142 extending flat and in the same plane as strap 41. When the two sections 17 and 18 are molded, they may be joined together by a third strap 143, lying in the same plane as straps 41 and 142, to thereby facilitate molding, and also facilitate handling of the two sections as a single unit prior to assembly. At or before the time of use of the device of FIG. 1, the strap 143 may be cut at the two points 59 and 60, and the halves of sections 17 and 18 may then be folded relative to one another to the conditions represented in FIG. 3. In using the device, the first step may be to insert section 18 into opening 11, and to the FIG. 1 position. This may be done by merely slipping the reduced dimension ends 50 of elements 141 and 42 into opening 11, and then pressing those parts axially inwardly until grooves 47 reach a point at which the inner edge of plate 10 about opening 11 can slip into the grooves. The resilience of strap 142 then urges halves 141 and 42 relatively away from one another, until surfaces 48 engage the inner edge of the plate at opening 11. During the insertion of section 18 into opening 11, the tapering configuration of outer surfaces 49 on sections 141 and 42 acts to progressively cam those sections toward on another, and into or near a condition of engagement with one another at 45 and 46, as surfaces 49 move along the inner edge of opening 11, and until sections 141 and 42 may snap outwardly when the grooves reach the location of plate 10.

Cord 12 is slipped through opening 11 either before or after section 18 is moved into position. The next step is then to place section 17 about cord 12, and then press section 17 and the contained cord axially outwardly (to the left as viewed in FIG. 1), until the FIG. 2 position is reached. When the section 17 is initially placed about cord 12, the size of the cord is such as to hold halves 19 and 20 of section 17 in a condition in which they are spaced apart somewhat farther than in FIG. 1. As section 17 is then pressed to the left within section 18, projections 38 engage inner tapering surfaces 52 and 53 of section 18, in a manner camming halves 19 and 20 relatively together, and into tight gripping engagement with cord 12. Since the insulation of cord 12 will normally have some resilience, this gripping of the cord by halves 19 and 20 in section 17 positively retains the cord against any movement relative to section 17. When section 17 ultimately reaches the FIG. 2 position, shoulders 38 snap radially outwardly (by virtue of the resilience of cord 12), to the FIG. 2 position beyond shoulders 55, to thereby lock section 17 against axial withdrawal from section 18. As will be apparent, the engaging surfaces of shoulders 38 and 55 must of course be sufficiently abrupt to attain this automatic action. In locked condition, the other projections 37 engage or substantially engage the inner surfaces 52 and 53 of section 18.

When assembled, the grommet structure tightly holds cord 12 in fixed position as it passes through opening 11, and prevents the transmission of any forces from cord 12 to electrical apparatus at the interior of the appliance. Also, the cord holding action is such as to virtually eliminate any tendency for wear of the cord at the grommet location. Further, the unique two section construction of the grommet assembly allows for extremely simple application of the grommet to an opening, and allows for positioning of the sections 17 and 18 about the cord, without the necessity for threading the cord through these parts, since each of the sections 17 and 18 has an opening in one side through which the cord may be slipped laterally.

I claim:

1. A strain relief grommet assembly adapted to be connected into an opening in a carrier part and comprising a first section containing a passage through which a cord may pass and adapted to constrict inwardly against said cord to grip it, and a second section having a passage within which said first section is receivable and is relatively axially movable, said second section having a tapered camming wall forming said passage and operable to cam said first section radially inwardly into gripping relation with a cord therein in response to movement of said first section in a predetermined axial direction relative to said second section, and shoulders on said two sections interengageable to retain said first section against movement relative to said second section in the opposite axial direction, said second section having a groove formed therein for receiving an inner edge of said carrier part about said opening to retain said second section against movement relative thereto, said first section having an essentially tapered outer surface received within said first tapered surface, said shoulders including a projection on said tapered outer surface of said first section and a shoulder in said second section engageable with said first shoulder to retain the two sections against separation.

2. A strain relief grommet assembly as recited in claim 1, in which each of said sections is formed of a pair of complementary halves movably secured together at one point by a flexible connector.

3. The combination comprising a carrier part having a wall containing an opening, an electrical cord passing through said opening, and a strain relief grommet assembly connected into said opening about said cord and including a first section containing a passage through which said cord passes and adapted to constrict inwardly against the cord to grip it, a second section having a passage within which said first section is received and is relatively axially movable, and camming surfaces on said sections operable to radially constrict said first section into gripping relation with the cord therein in response to movement of said first section in a predetermined axial direction relative to said second section, said second section having a groove formed therein receiving an inner edge of said carrier part about said opening to retain said second section against movement relative thereto.

4. The combination comprising a carrier part having a wall containing an opening, an electrical cord passing through said opening, and a strain relief grommet assembly connected into said opening about said cord and including a first section containing a passage through which said cord passes and adapted to constrict inwardly against the cord to grip it, and a second section having a passage within which said first section is received and is relatively axially movable, said second section having a tapered camming wall forming said passage and operable to cam said first section radially inwardly into gripping relation with the cord therein in response to movement of said first section in a predetermined axial direction relative to said second section, said first section having an essentially tapered outer surface received within said first tapered surface, said tapered outer surface of said first section having a shoulder formed thereon, and said second section having a shoulder engageable with said first mentioned shoulder to retain said first section against cord releasing axial movement relative to the second section, each of said sections being formed of a pair of complementary halves movably secured together at one point by a flexible connector.

5. A strain relief grommet assembly adapted to be connected into an opening in a carrier part and comprising a first section containing a passage through which a cord may pass and adapted to constrict inwardly against said cord to grip it, a second section having a passage within which said first section is receivable and is relatively axially movable, said second section having a generally radially outwardly facing groove formed therein for receiving an inner edge of said carrier part about said opening to retain said second section against axial movement relative to the carrier part, said second section being constrictable to a reduced transverse dimension for insertion axially into said opening and then expansion after such insertion to a condition locking said inner edge of the carrier part in said groove, and camming surfaces on said sections operable to radially constrict said first section into gripping relation with a cord therein in response to movement of said first section in a predetermined axial direction relative to said second section.

6. A strain relief grommet assembly as recited in claim 5, in which said first section is formed of a plurality of complementary segments which are relatively movable to grip said cord.

7. A strain relief grommet assembly as recited in claim 5, in which said second section is formed of a plurality of relatively movable complementary segments each extending partially about said first section.

8. A strain relief grommet assembly adapted to be connected into an opening in a carrier part and comprising a first section containing a passage through which a cord may pass and adapted to constrict inwardly against said cord to grip it, a second section having a passage within which said first section is receivable and is relatively axially movable, said second section having a generally radially outwardly facing groove formed therein for receiving an inner edge of said carrier part about said opening to retain said second section against axial movement relative to the carrier part, said second section being constrictable to a reduced transverse dimension for insertion axially into said opening and then expansion after such insertion to a condition locking said inner edge of the carrier part in said groove, and camming surfaces on said sections operable to radially constrict said first section into gripping relation with a cord therein in response to movement of said first section in a predetermined axial direction relative to said second section, said first section being constructed to restrain said second section against constriction from said condition in which said inner edge of the carrier part is received in said groove.

9. A strain relief grommet assembly adapted to be connected into an opening in a carrier part and comprising a first section containing a passage through which a cord may pass and adapted to constrict inwardly against said cord to grip it, a second section having a passage within which said first section is receivable and is relatively axially movable, said second section having a generally radially outwardly facing groove formed therein for receiving an inner edge of said carrier part about said opening to retain said second section against axial movement relative to the carrier part, said second section being constrictable to a reduced transverse dimension for insertion axially into said opening and then expansion after such insertion to a condition locking said inner edge of the carrier part in said groove, and camming surfaces on said sections operable to radially constrict said first section into gripping relation with a cord therein in response to movement of said first section in a predetermined axial direction relative to said section, said camming surfaces being constructed to restrain said second section against constriction from said condition in which said inner edge of the carrier part is received in said groove.

10. A strain relief grommet assembly adapted to be connected into an opening in a carrier part and comprising a first section containing a passage through which a cord may pass and adapted to constrict inwardly against said cord to grip it, a second section having a passage within which said first section is receivable and is relatively axially movable, said second section having a generally radially outwardly facing groove formed therein for receiving an inner edge of said carrier part about said opening to retain said second section against axial movement relative to the carrier part, said second section being constrictable to a reduced transverse dimension for insertion axially into said opening and then expansion after such insertion to a condition locking said inner edge of the carrier part in said groove, camming surfaces on said sections operable to radially constrict said first section into gripping relation with a cord therein in response to movement of said first section in a predetermined axial direction relative to said second section, and shoulders on said two sections interengageable to retain said first section against axial separation from said second section.

11. A strain relief grommet assembly adapted to be connected into an opening in a carrier part and comprising a first section containing a passage through which a cord may pass and adapted to constrict inwardly against said cord to grip it, a second section having a passage within which said first section is receivable and is relatively axially movable, said second section having a generally radially outwardly facing groove formed therein for receiving an inner edge of said carrier part about said opening to retain said second section against axial movement relative to the carrier part, said second section being constrictable to a reduced transverse dimension for insertion axially into said opening and then expansion after such insertion to a condition locking said inner edge of the carrier part in said groove, said second section having a tapered camming wall forming said passage and operable to cam said first section radially inwardly into gripping relation with a cord therein in response to movement of said first section in a predetermined axial direction relative to said second section, said first section having an essentially tapered outer surface received within said first tapered surface, a projection on said tapered outer surface of said first section, and a shoulder in said second section engageable with said projection to retain the two sections against axial separation, each of said sections being formed of a plurality of complementary segments which are relatively movable to constrict the sections.

12. The combination comprising a carrier part having a wall containing an opening, an electrical cord passing through said opening, and a strain relief grommet assembly connected into said opening about said cord and including a first section containing a passage through which said cord passes and adapted to constrict inwardly against the cord to grip it, a second section having a passage within which said first section is received and is relatively axially movable, and camming surfaces on said sections operable to radially constrict said first section into gripping relation with the cord therein in response to movement of said first section in a predetermined axial direction relative to said second section, said second section having a groove formed therein receiving an inner edge of said carrier part about said opening to retain said second section against movement relative thereto, said second section being constrictable to a reduced transverse dimension for insertion axially into said opening and then expansion after such insertion to a condition locking said inner edge of the carrier part in said groove.

13. The combination comprising a carrier part having a wall containing an opening, an electrical cord passing through said opening, and a strain relief grommet assembly connected into said opening about said cord and including a first section containing a passage through which said cord passes and adapted to constrict inwardly against the cord to grip it, a second section having a passage within which said first section is received and is relatively axially movable, and camming surfaces on said sections operable to radially constrict said first section into gripping relation with the cord therein in response to movement of said first section in a predetermined axial direction relative to said second section, said second section having a groove formed therein receiving an inner edge of said carrier part about said opening to retain said second section against movement relative thereto, said second section being constrictable to a reduced transverse dimension for insertion axially into said opening and then expansion after such insertion to a condition locking said inner edge of the carrier part in said groove, said camming surfaces being constructed to restrain said second section against constriction from said condition in which said inner edge of the carrier part is received in said groove.

14. The combination comprising a carrier part having a wall containing an opening, an electrical cord passing through said opening, and a strain relief grommet assembly connected into said opening about said cord and including a first section containing a passage through which said cord passes and adapted to constrict inwardly against the cord to grip it, a second section having a passage within which said first section is received and is relatively axially movable, camming surfaces on said sections operable to radially constrict said first section into gripping relation with the cord therein in response to movement of said first section in a predetermined axial direction relative to said second section, said second section having a groove formed therein receiving an inner edge of said carrier part about said opening to retain said second section against movement relative thereto, said second section being constrictable to a reduced transverse dimension for insertion axially into said opening and then expansion after such insertion to a condition locking said inner edge of the carrier part in said groove, and shoulders on said two sections interengageable to retain said first section against axial separation from said second section.

References Cited in the file of this patent

UNITED STATES PATENTS

| | | |
|---|---|---|
| 541,332 | Patterson | June 18, 1905 |
| 992,821 | Stewart | May 23, 1911 |
| 1,601,255 | Marra | Sept. 28, 1926 |
| 1,797,194 | Knapp | Mar. 17, 1931 |
| 1,832,138 | Pounder | Nov. 17, 1931 |
| 2,277,637 | Eby | Mar. 24, 1942 |
| 2,927,807 | Campbell | Mar. 8, 1960 |
| 2,952,730 | Simonds | Sept. 13, 1960 |
| 2,974,186 | Klumpp | Mar. 7, 1961 |

FOREIGN PATENTS

| | | |
|---|---|---|
| 623,460 | Germany | Dec. 20, 1935 |